No. 817,012. PATENTED APR. 3, 1906.
W. SOBEY.
CULTIVATOR.
APPLICATION FILED SEPT. 26, 1903.
3 SHEETS—SHEET 1.
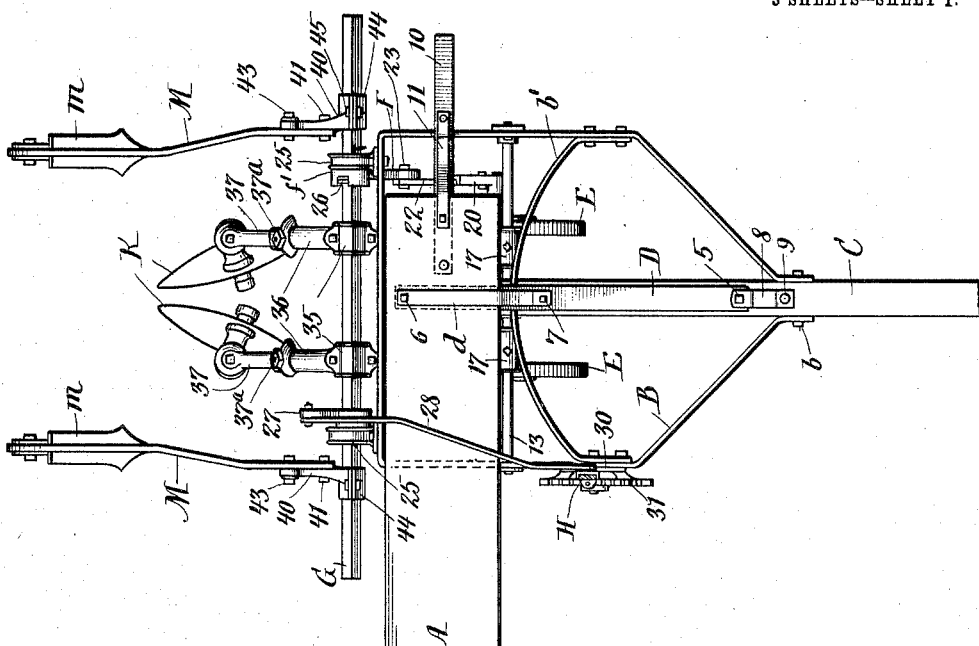
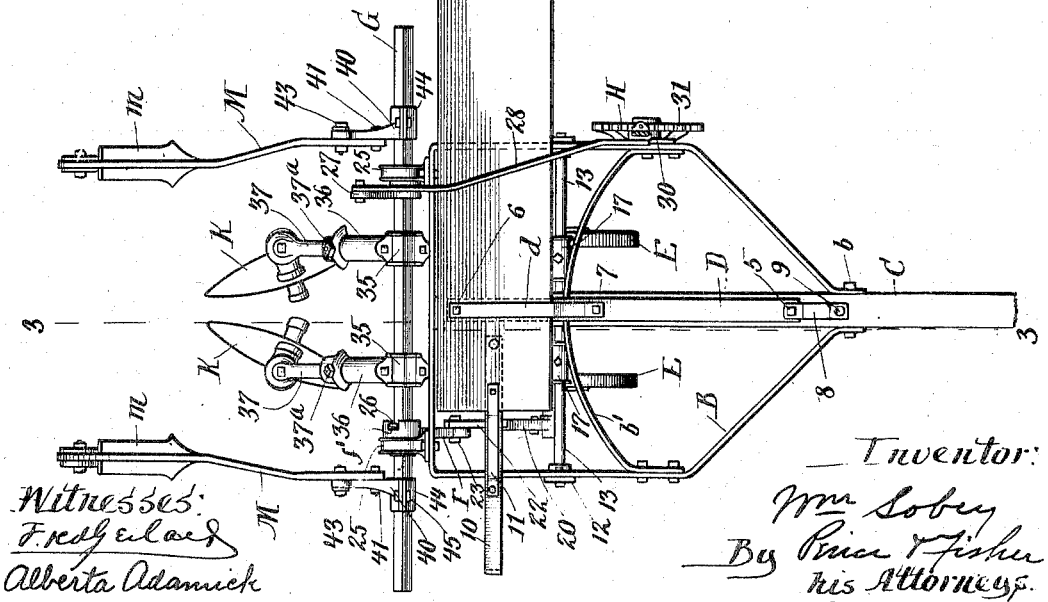

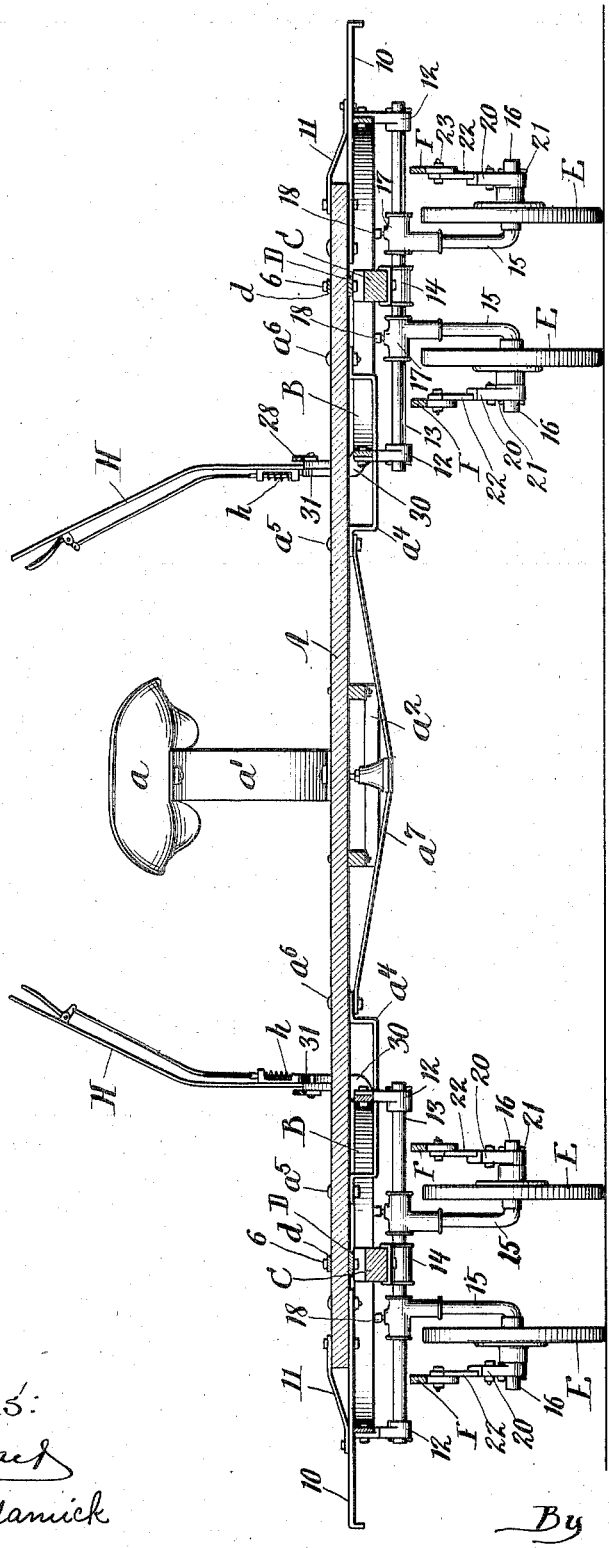

No. 817,012. PATENTED APR. 3, 1906.
W. SOBEY.
CULTIVATOR.
APPLICATION FILED SEPT. 26, 1903.
3 SHEETS—SHEET 3.
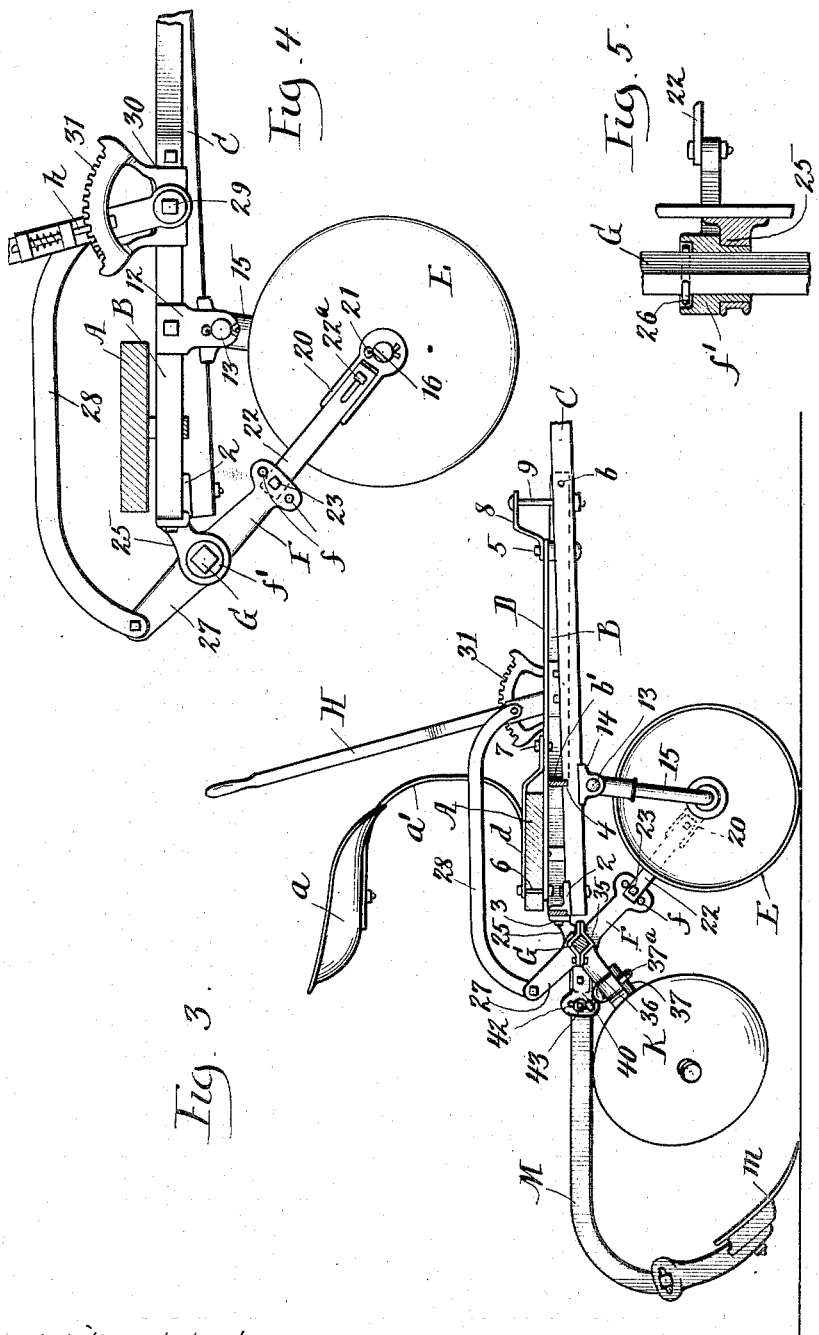
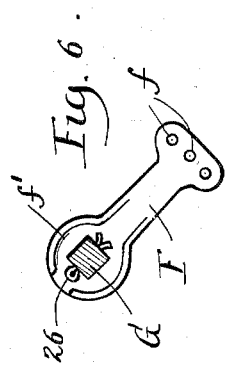
Witnesses:
Inventor

UNITED STATES PATENT OFFICE.

WILLIAM SOBEY, OF RACINE, WISCONSIN, ASSIGNOR TO J. I. CASE PLOW WORKS, OF RACINE, WISCONSIN, A CORPORATION.

CULTIVATOR.

No. 817,012.  Specification of Letters Patent.  Patented April 3, 1906.

Application filed September 26, 1903. Serial No. 174,713.

*To all whom it may concern:*

Be it known that I, WILLIAM SOBEY, a citizen of the United States, and a resident of Racine, county of Racine, and State of Wisconsin, have invented certain new and useful Improvements in Cultivators, of which the following is a full, clear, and exact description.

The present invention has relation more particularly to the improvement of lister-cultivators of that type in which individual gangs of cultivating devices, each furnished with its own pole or tongue, are connected by a transverse plank or bar whereon the driver's seat is mounted.

The principal objects of my present invention are, first, to so support the spreader-board or seat-plank with respect to the cultivator-gangs as to allow for greater freedom of movement between such parts with as little friction as possible; second, to provide effective means for controlling the movements of the cultivator appliances, their adjustment, &c., and, third, to improve in various respects the details of the structure.

With these objects in view my invention consists in the features of improvement hereinafter described, illustrated in the accompanying drawings, and more particularly pointed out in the claims at the end of this specification.

Figure 1 is a plan view of a double lister-cultivator embodying my invention. Fig. 2 is a view in vertical longitudinal section through the seat-plank, parts being shown in elevation. Fig. 3 is a view in vertical cross-section on line 3 3 of Fig. 1. Fig. 4 is an enlarged view showing in side elevation one of the ground-wheels and parts connected therewith, the seat-plank being shown in cross-section. Fig. 5 is a detail view, partly in plan and partly in horizontal section, showing the manner of connecting the ground-wheels to their transverse rock-shaft. Fig. 6 is a detail view in cross-section through the rock-shaft shown in Fig. 5, one of the shift-bars on said shaft being shown in side elevation.

The seat-plank or spreader-board A, as is clearly shown in Figs. 1 and 2 of the drawings, extends between the gangs of cultivating devices at its opposite ends. Inasmuch as the cultivating devices at each end of the seat-plank A are the same, a description of one will suffice for both, like characters of reference being employed upon corresponding parts at each end of the seat-plank. The center of the seat-plank A is shown as provided with the usual seat $a$ and seat-standard $a'$, and at the base of the standard $a$ a foot-rest $a^2$ projects forwardly from the seat-plank.

Each gang of cultivating devices is shown as comprising a metal frame B, the forward ends of which are bolted, as at $b$, to the corresponding tongue or pole C, and between the side bars of the frame B extends the transverse bar $b'$, that is preferably curved, as shown. Each of the poles or tongues C has bolted to its rear end a bracket 2, that is bolted, as at 3, to the back bar of the frame B, and, as shown, the tongue C is formed with a slot 4 to receive the lower edge of the transverse bar $b'$. Through the tongue C passes a pivot-bolt 5, that passes through the forward end of a pivot-bar D, the rear end of this bar D extending beneath the seat-plank A and being pivotally connected thereto by a through-bolt 6. The upper end of the through-bolt 6 passes through the rear end of a strap $d$, extending over the seat-board, the forward end of which is bolted, as at 7, to the pivot-bar D. The upper end of the pivot-bolt 5 passes through the rear end of a strap 8, through the forward end of which passes a draft pin or bolt 9, that is extended through the tongue C. The bar $b'$ of the gang-frame B is preferably on the arc of a circle of which the pivot-bolt 5 is the center, and inasmuch as the pivot-bar D rests upon the top of the transverse bar $b'$ the lateral movement of the pivot-bar D over the bar $b'$ will be occasioned with but little friction.

So far as I am aware this invention presents the first instance in which the seat-plank of a double-row cultivator has been connected to the individual gang-frames by pivot-bars supported or mounted to slide upon cross-bars of the frames, and in practice it is found that this manner of connecting the parts allows an ease of movement with but little friction. From each end of the seat-plank A extends a metal bar 10, that rests upon the upper edge of the outside bar of the frame B, and preferably a brace-bar 11 extends from the top of each of the bars 10 to the top side of the end of the seat-plank A.

To the under side of the seat-plank adjacent each end is attached a downwardly-bent retaining strap or bar $a^4$, that is bolted, as at $a^5$ and $a^6$, to the seat-plank, this strap or bar $a^4$ extending below the inner side bar of the corresponding gang-frame B. A truss-bar $a^7$ is preferably extended beneath the central portion of the seat-plank A, as clearly shown in Fig. 2 of the drawings.

It will be observed that the pivot-bars rest upon the cultivator-frames and extend between them and the spreader-board or seat-plank, so that the latter is held out of contact with the cultivator-frames and does not rub thereon as the cultivator-frames shift to and fro in following the separate rows. By this arrangement the cultivator-frames may shift freely to and from each other in following the separate rows with little friction and at the same time the parts are securely connected together.

From the side bars of each gang-frame B depend the journal-brackets 12, upon which are revolubly mounted the ends of the transverse rock-shaft 13, that is journaled in the brackets 12, and in a central journal-bracket 14, that is bolted to the under side of the tongue C. Upon the shaft 13 are mounted the depending arms 15, that carry the ground-wheels E, each of the arms 15 being bent outwardly to form a stub-axle 16, whereon the corresponding wheel E is journaled. The wheel-carrying arms 15 have their upper ends provided with tubular couplings 17, that are adjustably mounted upon the shaft 13, these couplings 17 being held in any desired position upon the shaft to adjust the tread of wheels E by means of set-screws 18, that pass through the couplings 17 and bear upon the revoluble shaft 13.

It will be understood that in the usual manner carrying-wheels E of each cultivator-frame passes upon opposite sides of the rows of corn and that these wheels engage the sides of the trench in which the corn is planted, so as to properly guide the cultivating devices. These carrying-wheels may be adjusted, as before described, to accommodate themselves to trenches of different width.

Over the outer ends of each of the stub-axles 16 sits a perforated link 20, that is held upon the axle by a cotter-pin 21, and to this link 20 is adjustably connected a second link section or bar 22 by a bolt $22^a$, the upper end of this bar being bolted, as at 23, to the lower end of a rock-arm or shift-bar F. The lower end of the rock-arm or shift-bar F is preferably provided with a series of holes $f$ to permit of adjustment between the bar F and the upper end of the bar 22. The upper end of each bar F is shown as formed with a hub $f'$, having a polygonal opening through which passes the rock-shaft G, (see Fig. 5,) and the hub $f'$ of the shift-bar F is formed with a reduced circular portion that is journaled in a bracket 25, bolted to the rear bar of the frame B. A cotter-pin 26, passing through the rock-shaft G, retains the hub of the shift-bar F in proper position with respect to the bracket 25. To the rock-shaft G is connected a rock-arm 27, and by means of this rock-arm the shaft G will be turned. The rock-arm 27 may be connected to the rock-shaft G in any suitable manner; but I prefer to form the inner end of the rock-arm 27 integral with the hub of one of the shift-bars F of each gang. The upper end of the rock-arm 27 is connected by a bar 28 to the lower end of an operating hand-lever H, that is pivoted, as at 29, to a bracket 30, bolted to the inner side bar of the frame B and carrying at its upper edge a notched segment 31, with which engages the usual latch $h$ of the operating-lever H.

Upon the rock-shaft G are adjustably mounted, by means of couplings 35, the disk-carrying arms 36, each of these arms having adjustably connected thereto a bar 37, that carries at its inner end a disk K. The disk-bars 37 are adjustably connected to the arms 36, preferably by eyebolts $37^a$, so that the disks may be set in any desired position. It will be understood, of course, that by adjusting the couplings 35 along the rock-shaft G the disks K may be set at the required distance apart. The operating hand-levers H, whereby the gangs or cultivating devices are controlled, are preferably bent inward toward the rider's seat $a$, as clearly shown in Fig. 2 of the drawings, so that these hand-levers are within the easy reach of the operator.

Upon each of the rock-shafts G is adjustably mounted a bracket 40, to which is secured the forward end of a shovel-beam M, the rear and downwardly-curved end of this beam M carrying a shoe or shovel $m$. Preferably each of the shovel-beams M is connected to its corresponding bracket 40 by a pivot-bolt 41, passing through the end of the shovel-beam and through the bracket 40 and to permit of the adjustment of the shovel-beam M with respect to the bracket. The bracket is formed with a slot 42, (see Fig. 3,) through which passes a clamp-bolt 43, that passes also through the beam. The hub of each of the brackets 40 is formed with a polygonal seat to receive the rock-shaft G, and each hub is provided with a detachable cap 44, that is bolted to the hub, as at 45.

In Fig. 3 the parts are shown with the cultivating devices slightly raised from their operative position in the ground. In the position shown it will be noted that the rock-arms $f$ and links 22 are nearly in line. By further slightly shifting the cultivating devices to operative position the connecting pivot-bolt 23 between the arm $f$ and the link 22 will be carried slightly upwardly and inwardly beyond a line through the centers of motion of the arm and link, so that the rear thrust upon the supporting-wheels $e$ tends to hold or lock the cultivating devices in the ground. In raising the cultivating devices the pivotal point of connection between the arm f and link 22 will be moved downwardly and outwardly beyond a line extending between the centers of motion of the arm and link, so that the rear thrust upon the wheels will then tend to lift the cultivating devices. It should be noted that the shift-lever H is connected directly to the rock-shaft G and that the connections between the shift-lever H and the rock-shaft are entirely independent of the arms that carry the cultivating devices and also of the arms 15 of the carrying-wheels. By this arrangement the carrying-wheels and cultivating devices may be adjusted laterally upon the rock-shafts G and 13 without in any way shifting the connections of the hand-lever H.

From the foregoing description it will be seen that the operator by manipulating the hand-levers H, or either of them, can at once raise or lower the disks and shovels of each gang and at the same operation can effect the corresponding rearward or forward movement of the ground-wheels E to properly balance the cultivator and parts carried thereby—that is to say, as the cultivating devices are shifted into and out of the ground or from working to riding position the carrying-wheels are moved backward and forward beneath the seat-plank, so that the weight of the rider will properly balance the parts, both in working and riding position. By varying the point of connection between the lower ends of the shift-bars F and the upper ends of the bars 22 the shift of the carrying-wheels E can be modified as desired, and this I regard as a feature of importance. By thus adjustably connecting the separate rock-shafts which carry the cultivating devices and supporting-wheels the relative positions of the wheels and cultivating devices may be changed so that the machine may be accurately balanced under different circumstances and with riders of different weight.

It is manifest that the precise details of construction and arrangement of parts above described may be varied without departure from the scope of the invention.

Having thus described my invention, what I claim as new, and desire to secure by Letters Patent, is—

1. In a double-row cultivator, the combination of a seat-plank, cultivator-frames at the ends of said seat-plank provided with transverse bars and with tongues secured to the rear bars of said cultivator-frames and secured to the front thereof and pivot-bars pivotally connecting the seat-plank and the cultivator-frames, said pivot-bars resting upon the transverse bars of the cultivator-frames.

2. In a double-row cultivator, the combination of a seat-plank, cultivator-frames at the ends of said seat-plank, comprising metal side and end bars and cross-bars, tongues secured to the end bars and to the converging forward ends of the side bars of the cultivator-frames, and pivot-bars pivotally connected to the seat-plank and extending forwardly therefrom above the cross-bars of the cultivator-frames, the forward ends of said pivot-bars being connected to said tongues.

3. In a double-row cultivator, the combination with a seat-plank, of cultivator-frames at the ends of said seat-plank comprising metal side and end bars united by curved cross-bars and pivot-bars resting upon said curved cross-bars, said pivot-bars being pivotally connected to the seat-plank and projecting forwardly therefrom and pivoted to the frame at the center of curvature of said curved cross-bars.

4. In a double-row cultivator, the combination with a seat-plank, of cultivator-frames and tongues at the ends of said seat-plank, said plank being provided at its ends with outwardly-projecting bars resting upon the cultivator-frames and being provided with retaining-straps extending beneath said cultivator-frames, and pivot-bars connecting said seat-plank with the tongues of said cultivator-frames.

5. In a double-row cultivator, the combination with the spreader-board and the separate cultivator-frames at the ends thereof, of bars pivoted at their rear ends to said spreader-board and extending forwardly therefrom and pivoted at their forward ends to said frames, and curved cross-bars on said frames for supporting said pivot-bars between their ends, said cross-bars being concentric with the forward pivots of said pivot-bars, substantially as described.

6. In a double-row cultivator, the combination with separate cultivator-frames, of a spreader-board extending across said frames, bars pivoted at their forward ends to said frames and extending rearwardly below said spreader-board, straps connected to said bars and extending above said spreader-board and pivot-bolts connecting said bars and straps and extending through said spreader-board.

7. In a double-row cultivator, the combination with separate cultivator-frames, of a spreader-board extending across said frames, bars pivoted to the forward ends of said frames and extending rearwardly above the cultivator-frames and beneath said spreader-board, pivot-bolts connecting said bars and said spreader-board and metal bars projecting from the ends of said spreader-board and resting on said cultivator-frames.

8. A cultivator comprising a cultivator-frame provided with a rock-shaft, cultivator appliances mounted upon said rock-shaft, a rock-arm on said rock-shaft, an operating hand-lever connected to said rock-arm, carrying-wheels mounted beneath the cultivator-frame, a second rock-shaft for sustaining said carrying-wheels and connections between the axles of said carrying-wheels and said first-mentioned rock-shaft.

9. A cultivator comprising a cultivator-frame provided with a rock-shaft, cultivator appliances laterally adjustable upon said rock-shaft, a rock-arm on said rock-shaft, an operating hand-lever connected to said rock-arm, a second rock-shaft mounted beneath the cultivator-frame, laterally-adjustable arms on said second shaft, carrying-wheels sustained by said laterally-adjustable arm and connections between said laterally-adjustable wheel-carrying arms and said first-mentioned rock-shaft.

10. A cultivator comprising a cultivator-frame provided with a rock-shaft, cultivator appliances mounted upon said rock-shaft, a rock-arm on said rock-shaft, an operating hand-lever connected to said rock-arm, carrying-wheels mounted beneath the cultivator-frame, a second rock-shaft for sustaining said carrying-wheels, arms depending from said second shaft having lateral extensions whereon said carrying-wheels are journaled and adjustable connections between said wheel-carrying arms and said first-mentioned rock-shaft.

11. A cultivator comprising a cultivator-frame provided with a rock-shaft, cultivator appliances mounted upon said rock-shaft, an upwardly-extending rock-arm on said rock-shaft, an operating hand-lever connected to said upwardly-extending rock-arm, a second rock-shaft journaled in advance of said first-mentioned rock-shaft and beneath the cultivator-frame, arms connected to said second shaft and provided with axles whereon said carrying-wheels are journaled, shift-bars projecting downwardly from said first-mentioned rock-shaft and connections between the lower ends of said shift-bars and the axles of the carrying-wheels.

12. A cultivator comprising a cultivator-frame provided with a rock-shaft having cultivator appliances mounted thereon, a rock-arm for shifting said rock-shaft, an operating hand-lever connected to said rock-arm, a second rock-shaft journaled in advance of said first-mentioned rock-shaft, arms connected to said second shaft and provided with axles whereon carrying-wheels are journaled, shift-bars projecting downwardly from said first-mentioned rock-shaft and connections adjustably uniting the lower ends of said shift-bars to the axles of the carrying-wheels.

13. A cultivator comprising a suitable frame, separate rock-shafts journaled on said frame, one in front of the other, cultivating devices adjustably mounted on the rear shaft, depending arms adjustably mounted upon the forward shaft, carrying-wheels journaled on said arms, connections between said arms and the rear rock-shaft, a shift-lever and connections independent of said first-mentioned connections between said shift-lever and one of said rock-shafts, substantially as described.

14. A cultivator comprising a suitable frame, a rock-shaft journaled at the rear of said frame, cultivating devices adjustably mounted thereon, a second rock-shaft journaled on said frame intermediate its front and rear ends, depending arms adjustably mounted on said second rock-shaft, connections between the rear rock-shaft and said arms, carrying-wheels journaled on said arms, a shift-lever and connections independent of said first-mentioned connections between said shift-lever and said rear rock-shaft.

15. A cultivator comprising a suitable frame, separate rock-shafts journaled thereon one in front of the other, cultivating devices mounted on the rear shaft, carrying-wheels mounted on the forward rock-shaft, means for adjustably connecting said rock-shafts and a shift-lever connected to one of said shafts independently of said connecting means, substantially as described.

16. A cultivator comprising a suitable frame, separate rock-shafts journaled on said frame, one in front of the other, cultivating devices mounted on the rear shaft, depending arms mounted on the forward rock-shaft, carrying-wheels journaled on said arms, connecting-toggles extending between said arms and the rear rock-shafts and a shift-lever connected to one of said shafts independent of one of said toggles, substantially as described.

17. A cultivator comprising a suitable frame, separate rock-shafts journaled on said frame one in front of the other, cultivating devices mounted on the rear shaft, depending arms on the forward rock-shaft, carrying-wheels journaled on the lower ends of said arms, rock-arms fixed to said rear shaft, links pivotally connected at their ends to said rock-arms and to the lower ends of said wheel-supporting arms, said links and rock-arms being arranged to extend substantially in line when said cultivating devices are in working position, and a shift-lever for simultaneously shifting said cultivating devices and carrying-wheels, substantially as described.

18. A cultivator comprising a suitable frame, separate rock-shafts journaled on said frame one in front of the other, cultivating devices mounted on the rear rock-shaft, depending arms mounted on the forward rock-shaft, carrying-wheels journaled on the lower ends of said arms, rock-arms mounted upon the rear rock-shaft, links each pivotally connected at its rear end to one of said rock-arms and at its forward end to the lower end of one of said wheel-supporting arms and means for simultaneously shifting said cultivating devices and said carrying-wheels, substantially as described.

19. A cultivator comprising a suitable frame, separate rock-shafts journaled on said frame one in front of the other, cultivating devices mounted on the rear rock-shaft, depending arms mounted on the forward rock-shaft, carrying-wheels journaled on the lower ends of said arms, rock-arms mounted upon the rear rock-shaft, each of said rock-arms being connected to one of said wheel-supporting arms by a link that is pivoted at its forward end to the lower end of the wheel-supporting arm and adjustably pivoted at its rear end to the rock-arm and means for simultaneously shifting said cultivating devices and said carrying-wheels, substantially as described.

20. A cultivator comprising a suitable frame, separate rock-shafts journaled on said frame one in front of the other, cultivating devices mounted on the rear rock-shaft, depending arms mounted on the forward rock-shaft, carrying-wheels journaled on the lower ends of said arms, rock-arms mounted upon the rear rock-shaft, each of said rock-arms being connected to one of said wheel-supporting-arms by a link that is pivoted at its forward end to the wheel-supporting arm and at its rear end to the rock-arm, each link and arm being arranged to shift on opposite sides of their line of centers, whereby the rearward thrust on the supporting-wheels will hold the cultivators in the ground and also assist in raising them from such position, and a shift-lever connected to one of said shafts for simultaneously moving said cultivating devices and said carrying-wheels, substantially as described.

21. A cultivator comprising a suitable frame, separate rock-shafts journaled on said frame, one in front of the other, cultivating devices mounted on the rear rock-shaft, depending arms mounted on the forward rock-shaft, carrying-wheels journaled on the lower ends of said arms, rock-arms mounted upon the rear rock-shaft, links connecting said rock-arms with the lower ends of said wheel-supporting arms, a shift-lever and means independent of said links for connecting said lever with one of said rock-shafts, substantially as described.

22. A cultivator comprising a suitable frame, separate rock-shafts journaled on said frame one in front of the other, cultivating devices mounted on the rear shaft, depending arms mounted on the forward rock-shaft and provided at their lower ends with stub-axles, carrying-wheels journaled on said axles, rock-arms on said rear rock-shaft, adjustable connecting-links pivoted at their forward ends to said stub-axles and rearwardly extending therefrom, the rear ends of said links being connected respectively to said rock-arms, a shift-lever, and means independent of said links for connecting said shift-lever to one of said shafts, substantially as described.

WILLIAM SOBEY.

Witnesses:
 EDITH A. SCHULZ,
 HAROLD PERRY ERSKINE.